US010856205B2

United States Patent
Benko et al.

(10) Patent No.: US 10,856,205 B2
(45) Date of Patent: Dec. 1, 2020

(54) POWER OPTIMIZATION IN HETEROGENOUS NETWORKS

(71) Applicant: Orange, Paris (FR)

(72) Inventors: John Benko, Mill Valley, CA (US); Akshay Jain, Union City, CA (US); Dachuan Yu, Redwood City, CA (US)

(73) Assignee: ORANGE, Paris (FR)

( * ) Notice: Subject to any disclaimer, the term of this patent is extended or adjusted under 35 U.S.C. 154(b) by 26 days.

(21) Appl. No.: 15/537,626

(22) PCT Filed: Dec. 18, 2015

(86) PCT No.: PCT/IB2015/002543
§ 371 (c)(1),
(2) Date: Jun. 19, 2017

(87) PCT Pub. No.: WO2016/097874
PCT Pub. Date: Jun. 23, 2016

(65) Prior Publication Data
US 2018/0070285 A1    Mar. 8, 2018

Related U.S. Application Data

(60) Provisional application No. 62/094,122, filed on Dec. 19, 2014.

(51) Int. Cl.
| | |
|---|---|
| *H04W 40/10* | (2009.01) |
| *H04L 12/721* | (2013.01) |
| *H04L 12/26* | (2006.01) |
| *H04W 28/02* | (2009.01) |
| *H04W 40/20* | (2009.01) |

(Continued)

(52) U.S. Cl.
CPC ......... *H04W 40/10* (2013.01); *H04L 43/0888* (2013.01); *H04L 43/0894* (2013.01);
(Continued)

(58) Field of Classification Search
CPC . H04W 40/10; H04W 40/20; H04W 28/0221; H04W 52/46; H04L 43/0888;
(Continued)

(56) References Cited

U.S. PATENT DOCUMENTS

| | | | |
|---|---|---|---|
| 6,603,748 B1* | 8/2003 | Lu | H04W 36/30 |
| | | | 370/329 |
| 6,697,375 B1* | 2/2004 | Meng | H04L 1/0002 |
| | | | 370/465 |

(Continued)

FOREIGN PATENT DOCUMENTS

| | | | | |
|---|---|---|---|---|
| WO | WO2010/144052 | * | 12/2010 | ............ H02W 52/02 |
| WO | 2014081364 A1 | | 5/2014 | |

OTHER PUBLICATIONS

International Search Report and Written Opinion dated Mar. 15, 2016 for corresponding International Application No. PCT/IB2015/002543, filed Dec. 18, 2015.

*Primary Examiner* — Ivan O Latorre
(74) *Attorney, Agent, or Firm* — David D Brush; Westman, Champlin & Koehler, P.A.

(57) ABSTRACT

A method includes identifying multiple communication paths extending from a source device and for each path, determining a data rate, a power level used to communicate over at least a portion of the path and a power per data rate value by dividing the power level by the data rate. One of the multiple communication paths is selected such that the selected communication path has the lowest power per data rate value given quality of service requirements of an application. The power per data rate can be optimized from the device perspective as well as an overall network perspective. A message is then sent over the selected communication path.

17 Claims, 7 Drawing Sheets

(51) Int. Cl.
*H04B 17/373* (2015.01)
*H04W 52/46* (2009.01)
*H04L 12/729* (2013.01)

(52) U.S. Cl.
CPC ............ *H04L 43/10* (2013.01); *H04L 45/124* (2013.01); *H04W 28/0221* (2013.01); *H04W 40/20* (2013.01); *H04B 17/373* (2015.01); *H04L 45/125* (2013.01); *H04W 52/46* (2013.01); *Y02D 30/00* (2018.01); *Y02D 30/70* (2020.08)

(58) Field of Classification Search
CPC ... H04L 43/10; H04L 43/0894; H04L 45/124; H04L 45/125; Y02D 70/142; Y02D 70/164; Y02D 30/20; Y02D 70/22; Y02D 70/326; H04B 17/373
See application file for complete search history.

(56) References Cited

U.S. PATENT DOCUMENTS

| | | | |
|---|---|---|---|
| 8,665,735 B2* | 3/2014 | Walley | H04L 41/5003 370/252 |
| 2001/0019541 A1* | 9/2001 | Jou | H04B 17/318 370/311 |
| 2002/0049561 A1* | 4/2002 | Garcia-Luna-Aceves | H04L 45/02 702/182 |
| 2004/0038697 A1* | 2/2004 | Attar | H04W 52/48 455/522 |
| 2007/0201371 A1* | 8/2007 | Chou | H04L 45/123 370/237 |
| 2008/0025378 A1* | 1/2008 | Mahany | H04B 1/707 375/150 |
| 2008/0186901 A1* | 8/2008 | Itagaki | H04W 92/18 370/315 |
| 2008/0232258 A1* | 9/2008 | Larsson | H04L 45/00 370/238 |
| 2009/0245159 A1* | 10/2009 | Oyman | H04B 7/2606 370/315 |
| 2009/0252134 A1 | 10/2009 | Schlicht et al. | |
| 2014/0071847 A1* | 3/2014 | Pantelidou | H04L 1/00 370/252 |
| 2015/0180772 A1* | 6/2015 | Hui | H04L 45/72 270/389 |
| 2016/0174106 A1* | 6/2016 | Lee | H04W 40/20 705/14.63 |
| 2017/0339589 A1* | 11/2017 | Reijonen | H04W 24/08 |

* cited by examiner

POWER OPTIMIZATION IN HETEROGENOUS NETWORKS

CROSS-REFERENCE TO RELATED APPLICATIONS

This Application is a Section 371 National Stage Application of International Application No. PCT/IB2015/002543, filed Dec. 18, 2015, published as WO 2016/097874 A1 on Jun. 23, 2016, in English, which is based on and claims the benefit of U.S. Provisional Patent Application No. 62/094,122, filed Dec. 19, 2014; the contents of which are hereby incorporated by reference in their entireties.

BACKGROUND

Mobile devices are generally network capable and can communicate with other devices over wired or wireless connections. Some mobile devices include multiple transmitters that allow the mobile device to communicate using multiple different communication channels protocols. For example, some mobile phones have the ability to communicate over a cellular network using cellular channels and protocols and over Wi-Fi networks using Wi-Fi channels and protocols. In addition, the path from the mobile device to another device may include multiple different types of communication links including wired and wireless links using different protocols and channels. From the perspective of such mobile devices, a heterogeneous network is available to the mobile device for communicating with remote devices.

Mobile devices tend to rely on either a star network topology or mesh network topology. In a star network topology, each mobile device in the network communicates with a base station or tower and does not communicate directly with other mobile devices in the network. In a mesh network, mobile devices are able to communicate with each other and with the base station or tower. Mesh networks may be fully connected in which every device in the network communicates with every other device in the network or may be partially connected such that every device in the network can communicate with at least one other device in the network but may not communicate directly with all of the devices in the network.

Every communication in a network requires the expenditure of power. The type of connection between the devices that are communicating, for example wired or wireless, and the distance between the two devices that are communicating have an impact on the amount of power required to communicate between the devices. In addition, the type of connection between devices, the protocol used to communicate between the devices, and the congestion of messages on the connection will limit the rate at which data may be transferred between the devices.

The discussion above is merely provided for general background information and is not intended to be used as an aid in determining the scope of the claimed subject matter. The claimed subject matter is not limited to implementations that solve any or all disadvantages noted in the background.

SUMMARY

A method includes identifying multiple communication paths extending from a source device and for each path, determining a data rate, a power level used to communicate over at least a portion of the path and a power per data rate value by dividing the power level by the data rate. One of the multiple communication paths is selected such that the selected communication path has the lowest power per data rate value. A message is then sent over the selected communication path.

In a further embodiment, a mobile device includes at least one transmitter configured to transmit signals, wherein a plurality of communication paths are available to the at least one transmitter. The mobile device also includes a processor configured to determine, for each of the plurality of communication paths, a ratio of a power level required to transmit signals along the communication path and a data rate at which data can be transmitted along the communication path, the processor is further configured to select one communication path from the plurality of communication paths on which to transmit a signal based on the ratios of the plurality of communication paths.

In a still further embodiment, a communication network server is provided in which a processor executing instructions perform steps that include identifying at least two communication paths from a source to a destination and for each communication path, identifying links in the communication path, determining a respective power level needed to transmit a signal along each link, determining a sum of the power levels needed to transmit the signal along each link, determining a data rate for communicating from the source to the destination along the communication path and dividing the sum by the data rate to determine a ratio for the communication path. The processor further selects a communication path with the lowest ratio and directs a signal along the selected communication path.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 is a flow diagram of a method of managing power usage in a device.

DETAILED DESCRIPTION

Mobile device users want to extend the battery life of their mobile devices for as long as possible. In addition, mobile device users want to be able to communicate quickly so as to provide text, image and video from their mobile device to other devices as fast as possible. In the embodiments below, communication paths are selected that take in consideration both the power required to communicate over the path and the data rate available on the path. The power consumed by the path and the data rate are combined into a single metric that can be used to compare paths in a heterogeneous network to determine which path should be selected for communication. In further embodiments, a credit mechanism is provided that allows devices to be credited for the power that the devices expend in relaying a message for another device.

Figure 1:
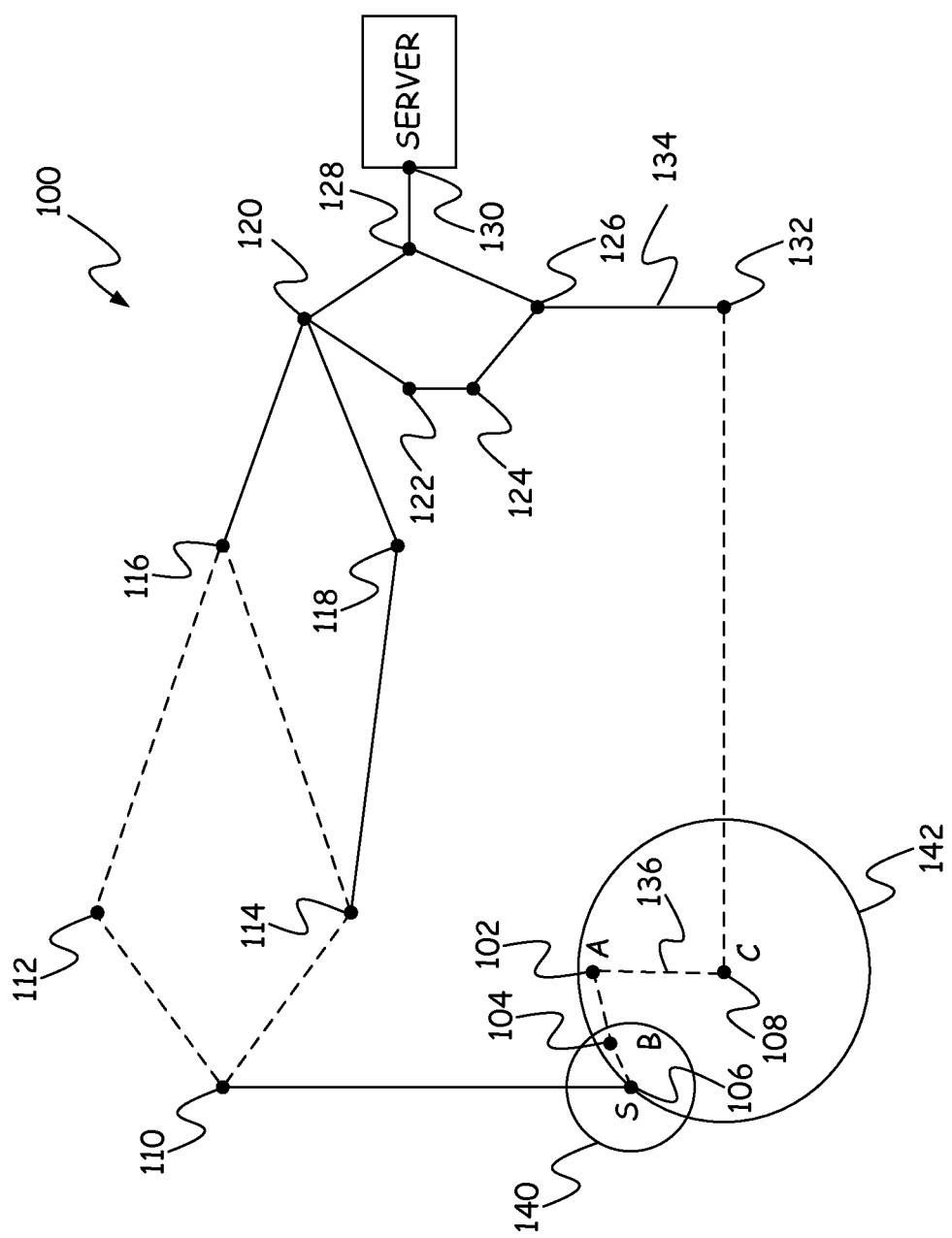
FIG. 1 is a diagram of a network environment.

FIG. 1 provides a diagram of a network environment showing various communication paths. In environment 100, devices that can receive and or transmit signals are shown as dots and are referred to as nodes such as nodes 102, 104, 106, 108, 110, 112, 114, 116, 118, 120, 122, 124, 126, 128, 130 and 132. Each node is connected to at least one other node by a link over which the two nodes may communicate in either a one-way direction or a two-way direction. Solid lines in FIG. 1 represent wired links while dotted lines indicate wireless links. For example, link 134 between node 126 and 132 is a wired link, while link 136 between node 102 and node 108 is a wireless link. A communication path is defined as one or more links between a source node and a destination node. In environment 100, there can be multiple communication paths between a source node and a destination node.

Environment 100 of FIG. 1 provides a heterogeneous network in which different links may use different technology and/or different protocols in order to communicate signals between the nodes on each end of the link. For example, some wireless links use a cellular technology associated with cellular devices while other wireless links use a Wi-Fi technology and protocol. Similarly, different wired links may use different protocols and technology for communicating between the nodes on each end of the wired link. In FIG. 1, node 106 is a base station for a small cell network that uses cellular radio channels and a cellular protocol for communication to communicate with devices within a coverage area 140 of base station 106. Node 108 is a cell tower in a cellular network that uses cellular radio channels and a cellular protocol to communicate wirelessly with devices that are within a coverage area 142 of tower 108. Coverage areas 140 and 142 are represented as circles in FIG. 1, but may have other shapes depending on the structure of base station 106 and tower 108 and interfering structures near base station 106 and tower 108. Nodes 102 and 104 are either mobile or fixed devices. Node 130 is a server that can determine communication paths between a source and a destination as described further below.

Figure 2:
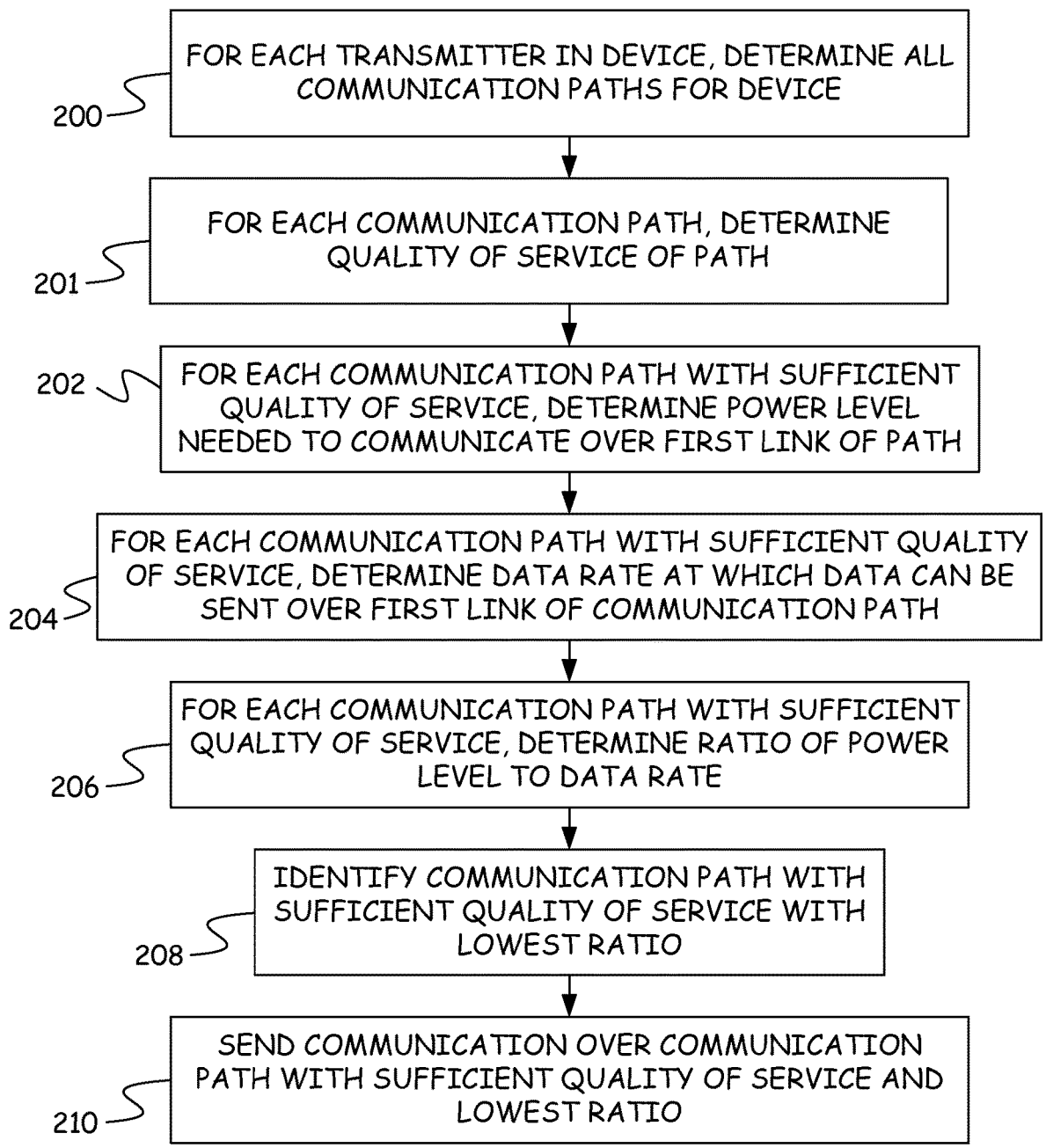
FIG. 2 is a flow diagram of a method of selecting a communication path from a device.

FIG. 2 provides a flow diagram of a method for selecting a communication path from multiple communication paths available to a device. In step 200 of FIG. 2, the device wanting to send the communication examines each of its communication transmitters and determines all communication paths for each transmitter. For example, if the device has both a cellular transmitter and a Wi-Fi transmitter, the device will identify all cell towers it can communicate with using the cellular transmitter and all Wi-Fi enabled devices it can communicate with using the Wi-Fi transmitter. In accordance with one embodiment, the communication paths extending from the device consist of those communication paths that end at a destination that the device is trying to reach. For example, if the Wi-Fi transmitter can communicate directly with three devices but only two of the devices have further connections that allow the device to communicate with the ultimate destination for the signal, only two communication paths will be identified for the Wi-Fi transmitter and the communication path to the third device that does not lead to the ultimate destination will not be included as an available communication path for this signal.

At step 201, the quality of service of each communication path is determined. The application wanting to send the message will generally have a minimum quality of service requirement. Such quality of service requirements can include bandwidth, maximum latency and jitter, for example. Latency and jitter can be measured calculated or estimated based on either control message signals from each link or from actual packets sent from another application that sent a previous message. If a particular link has not been used by the device, test "ping type" packets can be sent to determine the quality of service conditions of the link. If none of the communication paths satisfies the quality of service requirements of the application, the communication path that comes closest to satisfying the requirements is selected as the communication path for the signal.

At step 202, for each communication path that satisfies the quality of service requirements of the application, the power level needed to communicate over the first link of the path outwardly from the device is determined In accordance with some embodiments, this power level is the power level that was required to send a previous signal. In some embodiments, the power level is determined by sending a test signal across the first link of the path and receiving confirmation that the power level at which the test signal was sent was sufficient for successful communication. In still other embodiments, the power level needed to communicate over the first link of the path is determined using a distance between the two nodes on either end of the link and an equation that describes the power level needed to successfully communicate over that distance using the technology of the link. For example, the equation used in one embodiment is $P_{Tr} = P_{Rec} * r^2$ where $P_{Tr}$ is the power needed to transmit across the first link, $P_{Rec}$ is the minimum power that the signal needs to have when it reaches the receiving node and r is the distance between the transmitting node and the receiving node across the link.

At step 204, for each communication path that satisfies the quality of service requirements, a data rate is determined at which data can be sent over the first link of the communication path. This data rate is dependent on the analog limitations of the communication channels of the link, hardware considerations for the transmitters and receivers, and network congestion along the link from other communications. The data rate may be determined using bandwidth information about the analog limitations of the link, the bandwidths of the transmitters and receivers, and the amount of network congestion currently on the link. In other embodiments, the data rate at which a previous message was sent is used as the data rate. In still further embodiments, a test message may be sent and the data rate may be measured by dividing the size of the test message by the amount of time that was needed to send the test message.

At step 206, for each communication path that satisfies the quality of service requirements, a power efficiency value of the power level of the first link to the data rate of the first link is determined. The power efficiency, or power to data rate efficiency, is a metric that allows when calculated the determination of the most efficient link or path for sending a communication signal. A low power efficiency value of that metric will show that a data rate may be available at a low power cost to the network. At step 208, the communication path with the lowest ratio for the first link is identified and at step 210, a communication signal is sent over the communication path with the lowest ratio.

By determining the power efficiency value as a function of the power level and the data rate, the method of FIG. 2 combines two factors that are important to the user into one metric for each communication path. In particular, the user is interested in prolonging the life of the battery in their device so they want to use as little power as possible when communicating. At the same time, the user wants a high data rate so that they may send data quickly especially when they are sending large amounts of data associated with images and video. Providing a single metric that is a function of both of these factors allows for an efficient comparison of the available communication paths in a heterogeneous network and for the efficient selection of a single communication path when multiple communication paths are available. The power efficiency metric may be a simple ratio of the power level to the data rate obtained by dividing the power level by the data rate. Other functions of the power level and data rate may be elaborated by the man skilled in the art to increase the relevancy of the metric.

In accordance with one embodiment, the method of FIG. 2 is performed on the device that will send the communication. In other embodiments, a separate device, such as server 130, performs the method of FIG. 2 up to step 208 of identifying a communication path with the lowest ratio. The separate device then sends the identity of the selected communication path to the sending device, such as device 102, which the uses the selected communication path to send the communication. In accordance with some embodiments, the method of FIG. 2 is performed for each message that is to be sent. In other embodiments, the method of FIG. 2 is performed by each application when the application sends its first message. In still further embodiments, the method of FIG. 2 is performed on a periodic basis with multiple messages being sent over the selected communication path between iterations of the method of FIG. 2.

Figure 3:
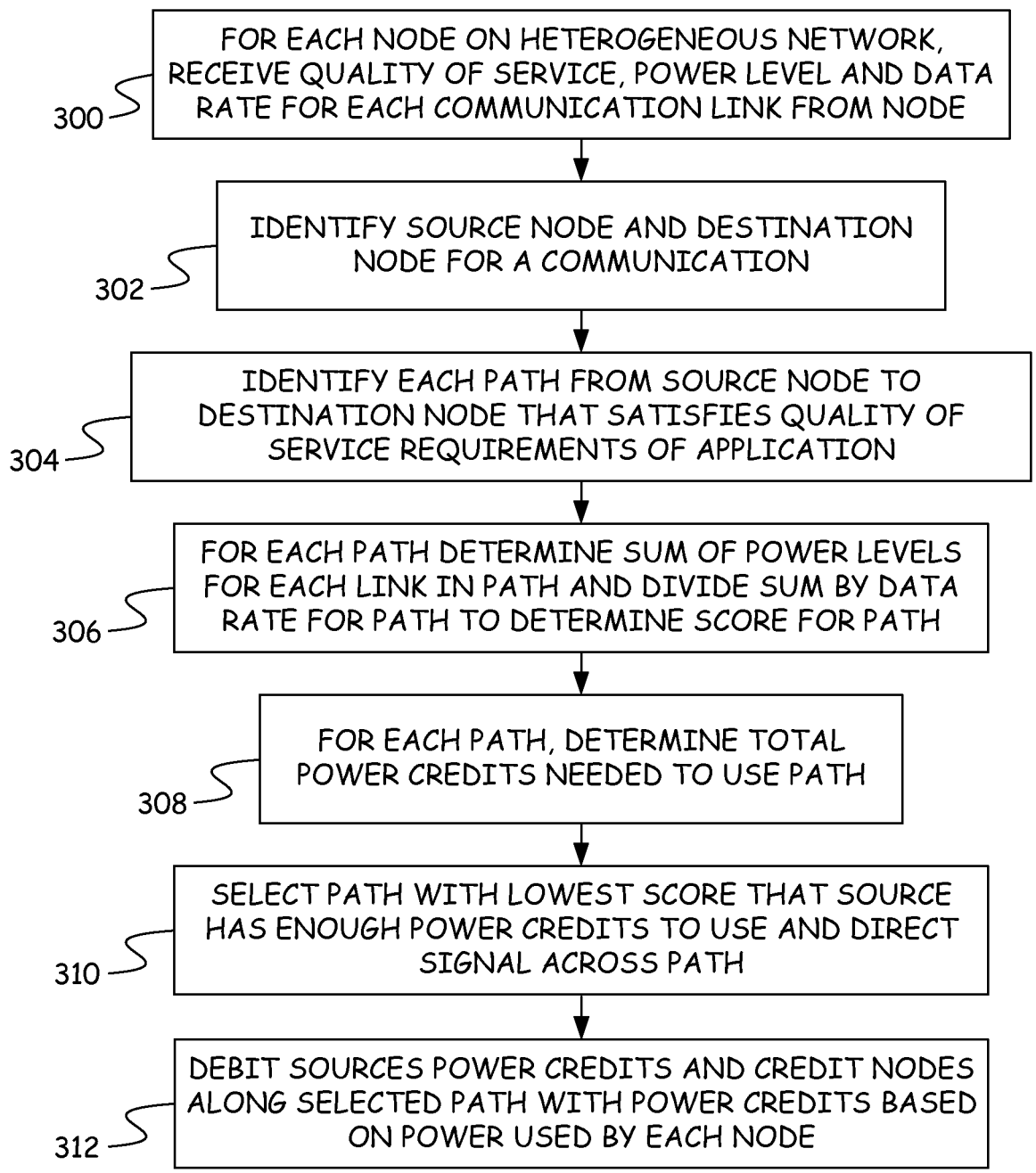
FIG. 3 is a flow diagram of a method of selecting a communication path in a heterogeneous network.

FIG. 3 provides a flow diagram of a method for identifying a multi-link communication path between a source and a destination when multiple communication paths are available between the source and destination.

In step 300, for each node on a heterogeneous network, a quality of service, a power level and a data rate for each communication link from the node are received. In accordance with one embodiment, each node sends the power level and data rate information that is received. The quality of service, power level and data rate information may be determined from previously sent messages, by sending a test signal and measuring quality of service, a power level and data rate directly. The power level and data rate may also be calculated based on factors such as the distance spanned by the link to determine the power level and factors that affect data rates such as the bandwidth of the channel, the congestion on the channel and delays inherent in the transmitters and receivers that use the protocol of the channel. This information may be received by a mobile device such as mobile device 102 or by a server such as server 130 of FIG. 1

At step 302, a source node and a destination node are identified for a communication. At step 304, each path from the source node to the destination node is identified. Each path may include one or more links and a path may include links using different wired and wireless technology. For example, a first link may be a Wi-Fi link, a second link may be a cellular link, and a third link may be a wired link.

At step 306, in accordance with one embodiment, the sum of the power levels for each link in the path is determined and this sum is divided by the data rate for the path to determine a power efficiency score or metric for the path. In accordance with one embodiment, the data rate for the path is the slowest data rate value of any one link in the path. In an additional embodiment, the step may only be performed for each path that satisfies a quality of service requirement of the application wanting to send a message. More generally, as in step 208, the power efficiency metric for each communication path may be seen as a function of the power level and the data rate over that path. With multiple links identified in a communication path, the power efficiency matrix may be a function of the power levels over each link (for instance by summing them) and the data rate (for instance by choosing the lower value as mentioned before).

After step 306, an optional step 308 is performed in which, for each path, a total number of power credits needed to use the path is determined. In embodiments that perform step 308, one or more devices in a heterogeneous network will carry communication signals for other devices only if the relaying devices are provided with power credits. These credits are associated with the amount of power that a device will expend to relay the communication signal. The amount of credits a device requires can be either set by the owner of the device or set uniformly by a power credit service. When a device wishes to send a communication signal through other devices, the sending device must surrender some of the power credits it has earned to the devices that will be relaying the signal on their behalf.

At step 310, the paths that the source device has enough credits to use as determined at step 308 are evaluated and the path with the lowest score as determined in step 306 is selected. The signal or message is then directed across the selected path. At step 312, the power credits for the source device are debited and the nodes along the selected path that require power credits for relaying the message are credited based on the power used by those nodes and the number of power credits required for that power level.

Figure 4:
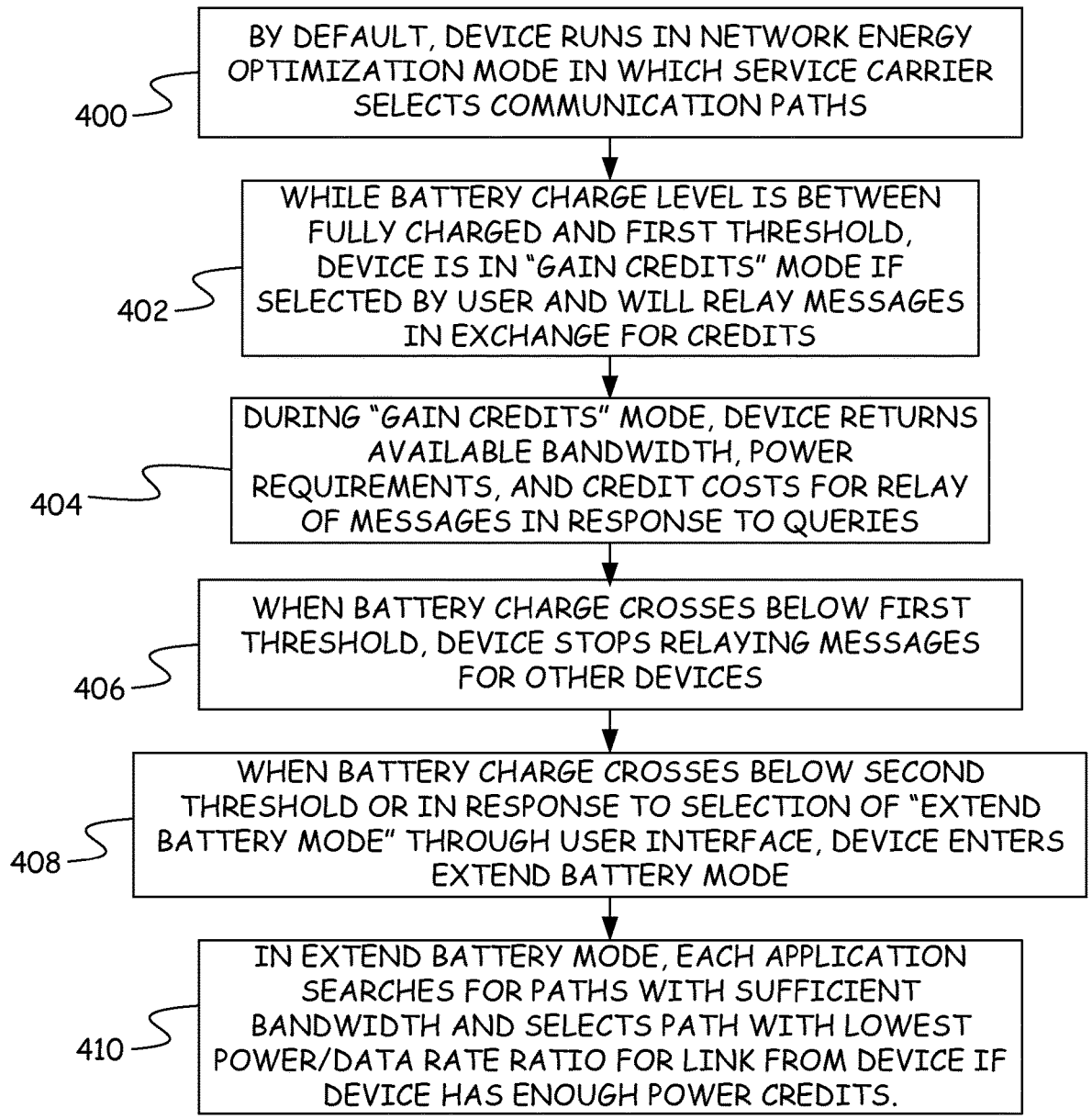
FIG. 4 provides a flow diagram of a method of operating a device in multiple different battery modes.

FIG. 4 provides a flow diagram of a method of operating a device in multiple different battery modes.

As shown in step 400, by default, a device runs in a network energy optimization mode where a service carrier selects the communication path(s) for the device. In accordance with one embodiment, the service carrier selects the communication path(s) that have the lowest power-to-data rate ratio over the portions of the path that the carrier pays to power. The user may also manually place the device in the network energy optimization mode using user interface 500 of FIG. 5. Specifically, by selecting Green Mode control 504, the user is able to place the device in the network energy optimization mode.

At step 402, while the battery charge level in a device is between a fully charged level and a first threshold, a user can place the device in a gain credits mode. In user interface 500, the user can place the device in the gain credits mode by selecting Gain Credits control 508. In particular, by selecting Gain Credits control 508, the user is able to place the device in a gain credits mode in which the device will relay messages for other devices in exchange for credits from the other devices. In some embodiments, the device is automatically placed in the gain credits mode when the charge level of the battery is between fully charged and the first threshold.

In step 404, while the device is in the gain credits mode, the device returns available bandwidth, power requirements, and credit costs for relaying messages in response to queries directed to the device. Thus, if a device that wishes to send a message requests the bandwidth available on a potential relaying device, the potential relaying device will provide that bandwidth as well as the amount of power that will be required to relay the message and the power credit costs for relaying the message.

At step 406, when the battery charge on a device crosses below the first threshold, the device exits the gain credits mode and stops relaying messages for other devices. Thus, the device automatically enters a power conservation mode in which it attempts to conserve its power usage instead of acquiring power credits by relaying messages.

At step 408, when the battery charge on the device crosses below a second threshold or in response to the selection of an extended battery mode through a user interface, the device enters an extend battery mode.

Figure 5:
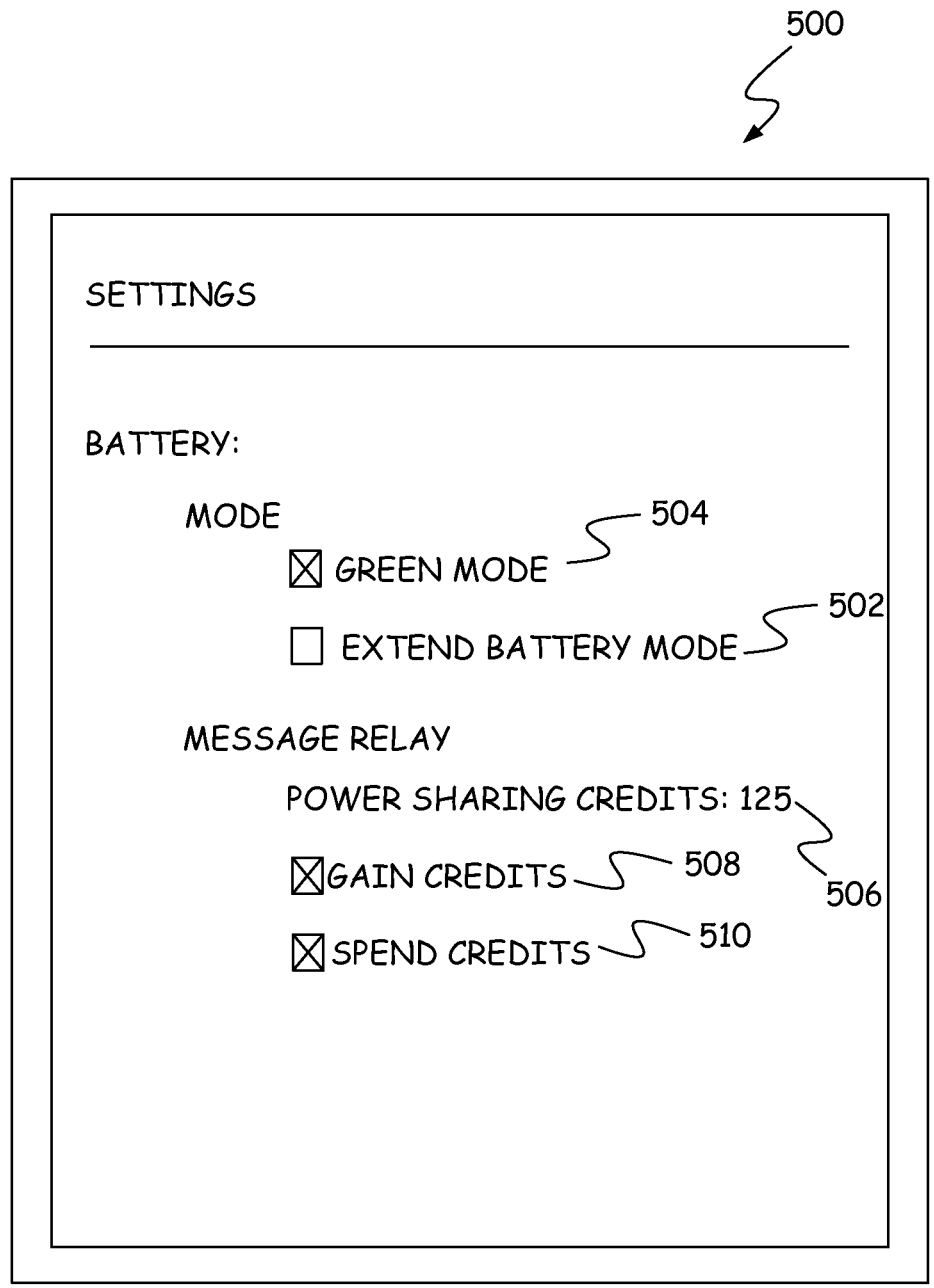
FIG. 5 is an example of a user interface for managing power usage in a device.

In user interface 500 of FIG. 5 the user can manually select Extend Battery Mode control 502 to place the device in the extend battery mode. As shown in step 410 of FIG. 4, in the extend battery mode, each application on the device searches for communication paths with sufficient bandwidth and selects a path with the lowest power-to-data rate ratio for the first link from the device. If a path requires power credits in order to relay the message, it can only be selected if the device is a spend credit mode, which can be set automatically or by selecting Spend Credit control 510. In the spend credit mode, the device allows the credits that it has earned to be exchanged for relaying a message. In addition, a path that requires credits can only be selected if the device has enough credits to use the path. If the devices along the path require more credits than the device currently has, the path cannot be selected and a path with a higher power-to-data rate but a lower credit requirement must be selected. As shown in FIG. 5, the available power sharing credits 506 are shown to the user.

Note that in step 410, each application makes its own determine of which path to select. Since different applications will have different quality of service requirements, applications operating at the same time may select different communication paths with different power-to-data rate ratios in order to acquire paths with sufficient bandwidth. For example, one application may be attempting to send emails while another application may be sending a message that includes video. The message sending the video will require greater bandwidth and as such, may be forced to select a path with a higher power-to-data rate ratio then the path that is selected by the lower bandwidth email application.

Under one scenario of the embodiments of FIGS. 4 and 5, on a morning bus trip to a meeting, a user realizes that the battery on their mobile device has low charge. The user chooses the extend battery mode and the spend credits mode, which allow the device to use power credits that the device has accumulated to select paths that have the lowest power-to-data rate ratio for the first link from the device. The user first activates an email application and creates text for the email application. When the user selects send, the email application begins to search for a communication path that will have sufficient bandwidth to accept the text of the email and a low power-to-data rate ratio for the first link. While the email application is looking for the best communication path, the user selects a messaging application and requests to send a video through the messaging application. The messaging application then begins to search for a communication path that has sufficient bandwidth for the video. Both the email application and the messaging application discover that there is a close device having a bandwidth of only 30 kb per second and a device that is farther away that offers a bandwidth of 300 kb per second. Since the closer device has a lower power-to-data rate ratio, both applications would prefer to use the closer device to relay their messages. However, the 30 kb per second bandwidth is insufficient for transmitting the video. As a result, the email application selects the closer device and sends the email through the closer device while the text application sends the video through the device that is farther away to take advantage of the greater bandwidth available on the farther device. Power credits are then provided to both the nearer and farther devices.

On a later day, the device has a full battery and by default goes into the network optimization mode, also referred to as the green mode, which allows the carrier to optimize the communications with the device to select the paths that are most power efficient for the carrier. Since the user's battery is full of charge, the user can also select the gain credits mode 508 using user interface 500 of FIG. 5. In this configuration, other devices can use this device to relay messages.

Figure 6:
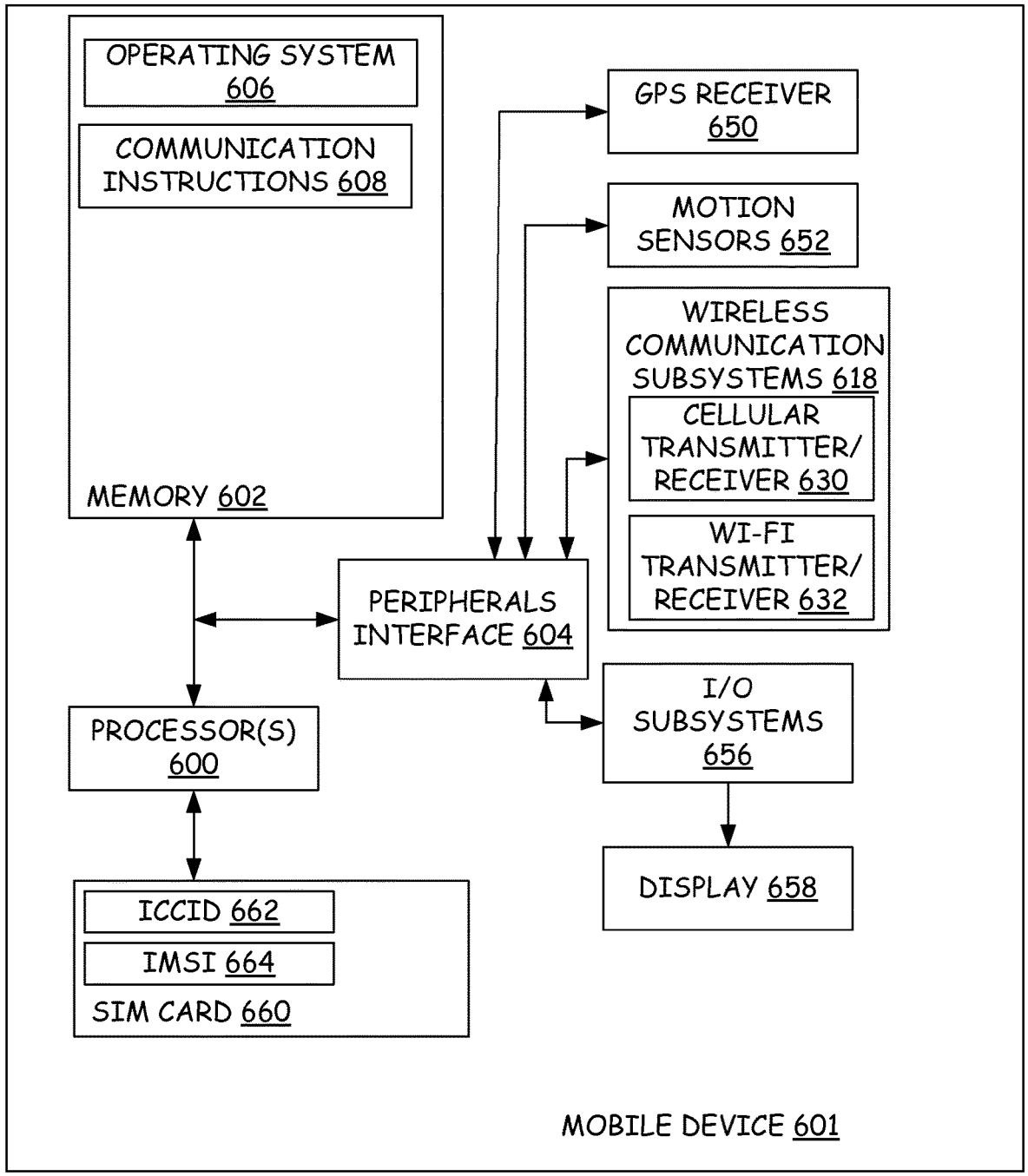
FIG. 6 is a block diagram of a mobile device that can be used with various embodiments.

FIG. 6 provides a block diagram of a mobile device 601, which is an example implementation of mobile device 102 above. Mobile device 601 includes one or more processors 600, such as a central processing unit or image processors, and a memory 602. Processor(s) 600 and memory 602 are connected by one or more signal lines or buses. Memory 602 can take the form of any processor-readable medium including a disk or solid-state memory, for example. Memory 602 includes an operating system 606 that includes instructions for handling basic system services and performing hardware-dependent tasks. In some implementations, operating system 606 can be a kernel. Memory 602 also includes various instructions representing applications that can be executed by processor(s) 600 including communication instructions 608 that allow processor 600 to communicate through peripherals interface 604 and wireless communication subsystems 618. Wireless communication subsystems 618 include a wireless cellular transmitter/receiver 630 for communicating across a wireless cellular telephony link and a Wi-Fi transmitter/receiver 632 for communicating across a Wi-Fi link. Although wireless communication subsystem 618 is only shown with two transmitters/receivers, in other embodiments additional transmitters/receivers are present for additional communication channels and protocols.

Processor 600 is configured by instructions in memory 602 to determine, for each of a plurality of communication paths, a ratio of a power level required to transmit signals along the communication path and a data rate at which data can be transmitted along the communication path. Processor 600 is further configured by the instructions in memory 602 to select one communication path from the plurality of communication paths on which to transmit a signal based on the ratios of the plurality of communication paths.

Peripherals interface 604 also provides access between processor(s) 600 and one or more of a GPS receiver 650, motion sensors 652, and input/output subsystems 656. GPS receiver 650 receives signals from Global Positioning Satellites and converts the signals into longitudinal and latitude information describing the location of mobile device 601. The position of mobile device 601 may also be determined using other positioning systems such as Wi-Fi access points, television signals and cellular grids. Motion sensors 652 can take the form of one or more accelerometers, a magnetic compass, a gravity sensor and/or a gyroscope. Motion sensors 652 provide signals indicative of movement or orientation of mobile device 601. I/O subsystems 656 control input and output for mobile device 601. I/O subsystems 656 can include a touchscreen display 658, which can detect contact and movement or break thereof using any of a plurality of touch sensitivity technologies including, but not limited to capacitive, resistive, infrared and surface acoustic wave technologies as well as other proximity sensor arrays or other elements for determining one or more points of contact with display 658. Other inputs can also be provided such as one or more buttons, rocker switches, thumb wheel, infrared port, USB port and/or pointer device such as a stylus.

Mobile device 601 also includes a subscriber identity module, which in many embodiments takes the form of a SIM card 660. SIM card 660 stores an ICCID 662 and an IMSI 664. ICCID 662 is the Integrated Circuit Card Identifier, which uniquely identifies this card on all networks. IMSI 664 is the international mobile subscriber identity, which identifies the SIM card on an individual cellular network. When communicating through wireless communication subsystems 618, processor(s) 600 can use identifiers 662 and/or 664 to uniquely identify mobile device 601 during communications. In accordance with many embodiments, SIM card 660 is removable from mobile device 601 and may be inserted in other devices.

Figure 7:
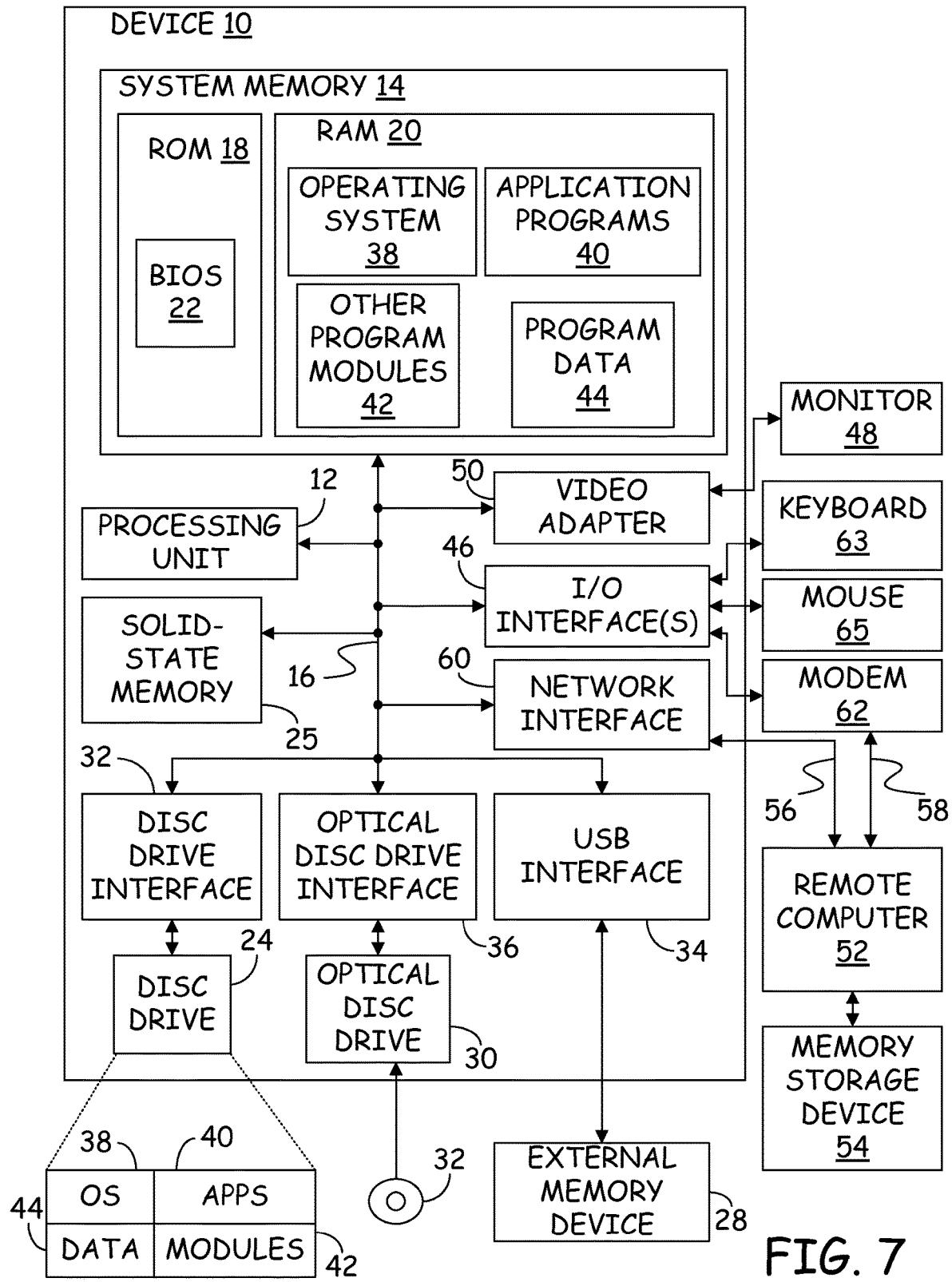
FIG. 7 is a block diagram of a computing device that can be used with various embodiments.

An example of a computing device 10 that can be used as a server, such as server 130, in the various embodiments is shown in the block diagram of FIG. 7. Computing device 10 of FIG. 7 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18.

Processing unit 12 is configured by instructions in system memory 14 to identify at least two communication paths from a source to a destination. For each communication path, processing unit 12 identifies links in the communication path, determines a respective power level needed to transmit a signal along each link, determines a sum of the power levels needed to transmit the signal along each link, determines a data rate for communicating from the source to the destination along the communication path and divides the sum by the data rate to determine a ratio for the communication path. Processing unit 12 then selects a communication path with the lowest ratio and directs a signal along the selected communication path.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, a solid state memory 25, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives, solid state memory and external memory devices and their associated computer-readable media provide nonvolatile storage media for computing device 10 on which computer-executable instructions and computer-readable data structures may be stored. Other types of media that are readable by a computer may also be used in the exemplary operation environment.

A number of program modules may be stored in the drives, solid state memory 25 and RAM 20, including an operating system 38, one or more application programs 40, other program modules 42 and program data 44.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

Computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 5. The network connections depicted in FIG. 5 include a local area network (LAN) 56 and a wide area network (WAN) 58. Such network environments are commonplace in the art.

Computing device 10 is connected to the LAN 56 through a network interface 60. Computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 5 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method executed by a source device and comprising:
the following acts performed by the source device:
identifying multiple communication paths extending from the source device on at least one communica- tion network, each of the multiple communication paths comprising a plurality of links;

for each communication path, determining a data rate for communicating from said source device to a destination device along each link of the communication path;

for each communication path, determining a power level used to communicate over each link of the communication path by sending a test message across the link and receiving confirmation that a power level at which the test message was sent is sufficient for successful communication;

for each communication path, determining a power to data rate efficiency value as a function of the determined power level of at least one of the links of the communication path and data rate of at least one of the links of the communication path; and selecting one of the multiple communication paths such that the selected communication path has the lowest power to data rate efficiency value;

configuring the source device to communicate over the selected communication path; and sending a message by the source device over the selected communication path to the destination device on the at least one communication network.

2. The method of claim 1 wherein determining a data rate comprises measuring the data rate at which the test message was sent.

3. The method of claim 1 wherein determining a data rate comprises determining the data rate based on congestion on the respective link of the communication path.

4. The method of claim 1 wherein at least one of the multiple communication paths comprises a series of the plurality of links between a plurality of devices from the source device to the destination device.

5. The method of claim 4 wherein at least one of the devices in the plurality of devices comprises a cell tower for a cellular network.

6. The method of claim 1 wherein identifying multiple communication paths comprises identifying at least one communication path from at least two different transmitters in the source device.

7. The method of claim 1, wherein the power to data rate efficiency value is a ratio of the power level divided by the data rate.

8. A mobile device comprising:
at least one transmitter configured to transmit signals, wherein a plurality of communication paths are available to the at least one transmitter, each of the multiple communication paths comprising a plurality of links; and a processor configured to:
identify multiple communication paths extending from the source device on at least one communication network, each of the multiple communication paths comprising a plurality of links;

for each communication path, determine a data rate for communicating from said source device to a destination device along each link of the communication path;

for each communication path, determine a power level used to communicate over each link of the communication path by sending a test message across the link and receiving confirmation that a power level at which the test message was sent is sufficient for successful communication;

for each communication path, determine a power to data rate efficiency value as a function of the determined power level of at least one of the links of the communication path and data rate of at least one of the links of the communication path; and select one of the multiple communication paths such that the selected communication path has the lowest power to data rate efficiency value;

configure the mobile device to communicate over the selected communication path using the at least one transmitter; and send a message over the selected communication path to the destination device on the at least one communication network.

9. The mobile device of claim 8 wherein the power to data rate efficiency value for a communication path is obtained as a ratio of the power level divided by the data rate for said communication path.

10. The mobile device of claim 8 wherein the processor determines the power to data rate efficiency value of a communication path by sending the test message across the communication path and measuring the power level required to transmit the test message and the data rate at which the test message was sent.

11. The mobile device of claim 8 wherein the processor determines the ratio of the communication path by calculating a power level required based on a distance from the mobile device to a destination and a calculated data rate.

12. The mobile device of claim 8 wherein the processor further communicates the power to data rate efficiency value for each of the plurality of communication paths to a server.

13. A communication network server comprising:
a processor executing instructions to perform steps comprising:
identifying a plurality of communication paths in at least one communication network from a source device to a destination device, each of the plurality of communication paths comprising a plurality of links;

for each communication path of the plurality, determining a power level used to communicate over each link of the communication path by sending a test message across the link and receiving confirmation that a power level at which the test message was sent is sufficient for successful communication, determining a data rate for communicating from the source device to the destination device along each link of the communication path, and calculating a power to data rate efficiency value as a function of the determined power level of at least one of the links of the communication path and data rate of at least one of the links of the communication path;

selecting a communication path with the lowest power to data rate efficiency value; and configuring the at least one network to direct a signal, which is transmitted by the source device to the destination device, along the selected communication path.

14. The communication network server of claim 13 wherein the power to data rate efficiency value is a function of the sum of the power levels for each link and the slowest data rate value of any link in the communication path.

15. The communication network server of claim 13 wherein determining the data rate comprises determining the data rate from a data rate for each link.

16. The communication network server of claim 15 wherein determining the data rate further comprises selecting the slowest data rate of the links along a communication path as the data rate for communicating from the source device to the destination device along the communication path.

17. A non-transitory computer-readable medium having computer-executable instructions stored thereon that when executed by a processor of a source device cause the source device to perform acts comprising:
   identifying multiple communication paths extending from the source device on at least one communication network, each of the multiple communication paths comprising a plurality of links;
   for each communication path, determining a data rate for communicating from said source device to a destination device along each link of the communication path;
   for each communication path, determining a power level used to communicate over each link of the communication path by sending a test message across the link and receiving confirmation that a power level at which the test message was sent is sufficient for successful communication;
   for each communication path, determining a power to data rate efficiency value as a function of the determined power level of at least one of the links of the communication path and data rate of at least one of the links of the communication path; and
   selecting one of the multiple communication paths such that the selected communication path has the lowest power to data rate efficiency value;
   configuring the source device to communicate over the selected communication path; and
   sending a message by the source device over the selected communication path to the destination device on the at least one communication network.

* * * * *